(12) United States Patent
Helm et al.

(10) Patent No.: US 7,133,371 B2
(45) Date of Patent: Nov. 7, 2006

(54) METHODS FOR ACHIEVING RELIABLE JOINS IN A MULTICAST IP NETWORK

(75) Inventors: David Helm, Carol Stream, IL (US); Thomas J Senese, Schaumburg, IL (US); Daniel J McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/728,359

(22) Filed: Dec. 1, 2000

(65) Prior Publication Data

US 2002/0067724 A1    Jun. 6, 2002

(51) Int. Cl.
*H04L 12/16* (2006.01)

(52) U.S. Cl. ............... 370/270; 370/390; 370/396; 370/400; 370/420; 370/432

(58) Field of Classification Search ........ 370/351–352, 370/338, 389–390, 392, 395.31, 395.51, 370/401, 432, 312, 496, 400, 420, 270, 396; 455/518–519, 503
See application file for complete search history.

(56) References Cited

U.S. PATENT DOCUMENTS

| | | | |
|---|---|---|---|
| 4,740,954 A * | 4/1988 | Cotton et al. ............ | 370/408 |
| 6,006,259 A * | 12/1999 | Adelman et al. | |
| 6,078,957 A * | 6/2000 | Adelman et al. | |
| 6,208,647 B1 * | 3/2001 | Deng et al. | |
| 6,240,089 B1 * | 5/2001 | Okanoue et al. | |
| 6,266,339 B1 * | 7/2001 | Donahue et al. | |
| 6,331,983 B1 * | 12/2001 | Haggerty et al. | |
| 6,515,994 B1 * | 2/2003 | Chuah et al. ............ | 370/395.6 |
| 6,654,371 B1 * | 11/2003 | Dunstan et al. ............ | 370/390 |
| 6,704,576 B1 * | 3/2004 | Brachman et al. .......... | 455/503 |
| 6,847,633 B1 * | 1/2005 | Ryu et al. .................... | 370/352 |
| 2002/0006158 A1 * | 1/2002 | Schmidl et al. ............ | 375/150 |
| 2003/0043804 A1 * | 3/2003 | Kumar et al. ............... | 370/390 |
| 2005/0147086 A1 * | 7/2005 | Rosenberg et al. ......... | 370/352 |

* cited by examiner

*Primary Examiner*—John Pezzlo
*Assistant Examiner*—Inder Pal Mehra
(74) *Attorney, Agent, or Firm*—Steven R. Santema; Terri S. Hughes; Indira Saladi

(57) ABSTRACT

Methods are described that enable host devices of a multicast IP network to reliably join multicast group address(es) in talkgroup or point-to-point calls. For a talkgroup call, a sourcing host sends "hello" packets or payload to one or more network devices, addressed to a multicast group address. The receiving host issues a join command to the one or more network devices in an attempt to reliably join the multicast group address. If any packets are received by the receiving host within a designated time period associated with the attempt, the receiving host is reliably joined to the multicast group address. For a point-to-point call, a controller sends a pair of multicast group addresses, one designated for sourcing packets and the other designated for receiving packets, to a first and second host participating in the point-to-point call. The designated "source" and "receive" multicast group address are complementary for the first and second hosts. When the first or second host is acting as a source, it sends hello packets or payload addressed to its designated "source" multicast group address. When the first or second host is acting as a receiver, it attempts to join its designated "receive" multicast group address. The first or second host acting as a receiver knows that it is reliably joined to its designated "receive" multicast group address if it receives any packets addressed to that address within a designated time period.

20 Claims, 8 Drawing Sheets

FIG.4  GROUP_RELIABLE_JOIN_NORMAL

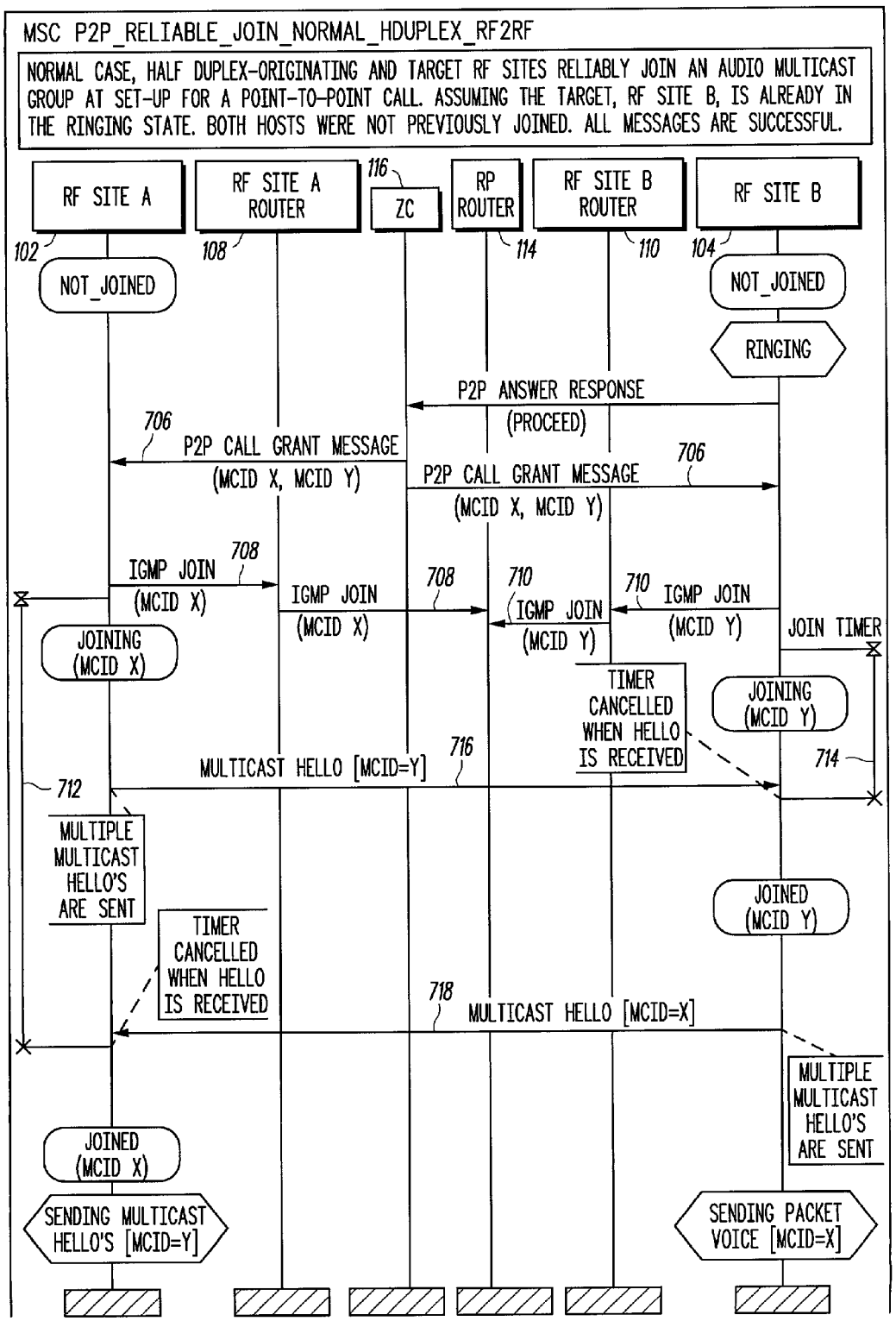
FIG. 7 P2P_RELIABLE_JOIN_NORMAL_HDUPLEX_RF2RF

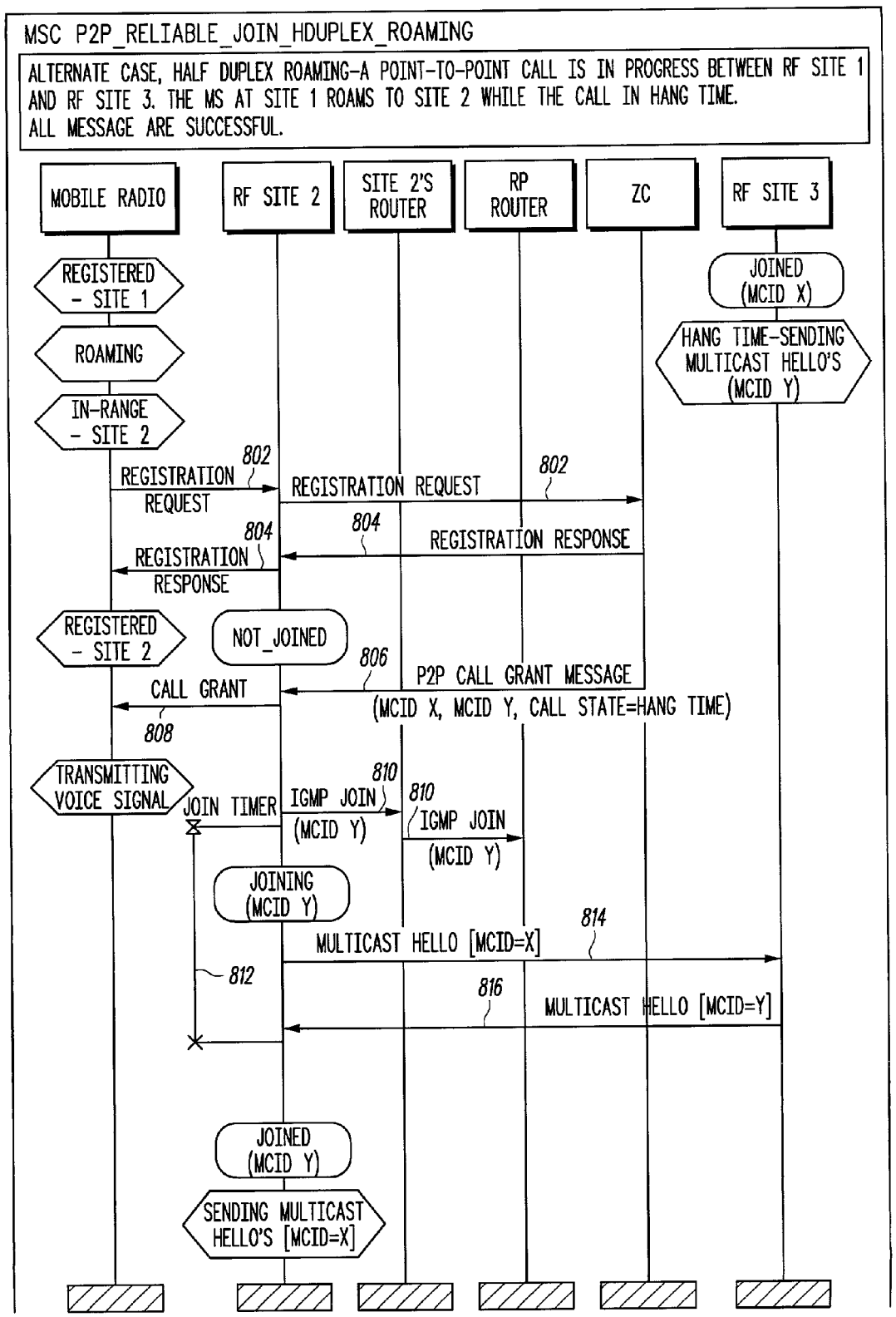

METHODS FOR ACHIEVING RELIABLE JOINS IN A MULTICAST IP NETWORK

FIELD OF THE INVENTION

This invention relates generally to communication systems, and particularly communication systems incorporating Multicast Internet Protocol (IP) addressing.

BACKGROUND OF THE INVENTION

Communication systems typically include a plurality of communication units, such as mobile or portable radio units and dispatch consoles that are located at multiple sites. Typically, the various sites include base site repeaters ("repeaters") for transceiving information such as control, voice, data and network management traffic between the communication units and each other. The repeaters and consoles are typically connected to other fixed portions of the communication system (i.e., the infrastructure) via wireline connections. The repeaters communicate with communication units and/or other repeaters at their respective sites via radio frequency (RF) communication resources, typically comprising voice and/or data resources such as, for example, narrow band frequency modulated channels, time division modulated slots, carrier frequencies, frequency pairs, etc. Communication systems are sometimes logically divided into various subgroups, known as talkgroups, which can be made up of communication units and/or consoles at different sites desiring to participate in a group or dispatch call. Communication systems may also support point-to-point calls between two communication devices which can comprise communication units and/or consoles at different sites.

Communication systems are often classified as circuit-switched or packet-switched, referring to the way data is communicated between fixed endpoints (e.g., repeater and console sites) of the system for either group calls or point-to-point calls. Historically, radio communication systems have used circuit-switched architectures where each endpoint is linked, through dedicated or on-demand circuits, to a central radio system switching point, or "central switch." The circuits providing connectivity to the central switch require a dedicated wire for each endpoint whether or not the endpoint is participating in a particular call. More recently, communication systems are beginning to use packet-switched networks using the Internet Protocol (IP). In these systems, data that is to be transported between endpoints (or "hosts" in IP terminology) is divided into IP packets called datagrams. The datagrams include addressing information (e.g., source and destination addresses) that enables various routers forming an IP network to route the packets to the specified destination(s). The destination addresses may identify a particular host or may comprise an IP Multicast address shared by a group of hosts.

Examples of IP Multicast communication systems are described and claimed in U.S. Pat. No. 6,141,347, titled "Wireless Communication System Incorporating Multicast Addressing and Method for Use" and U.S. patent application Ser. No. 09/464,269, titled "Methods for Implementing a Talkgroup Call in a Multicast IP Network," each of which is assigned to the assignee of the present invention and incorporated herein by reference in its entirety. In an IP Multicast based system, host devices desiring to receive the IP packets join a multicast group address by sending Internet Group Management Protocol (IGMP) "Join" messages to their local router(s) which messages, in turn, are forwarded to downstream router(s). Based on the IGMP Join messages, the routers of the network build a spanning tree of router interfaces and necessary routes between those interfaces to support a call (e.g., a talkgroup or point-to-point call) between the endpoints participating in the call.

However, one problem presently encountered in IP multicast based systems is that IGMP Join messages are unreliable. That is because IGMP Join messages are delivered as "best effort" datagrams, thus it is possible that they may be corrupted somewhere in the network and not delivered to all of the downstream routers. As a result, it is possible that certain hosts (e.g., repeaters or consoles) having attempted to Join the multicast group address will not have Joined successfully and thereby will not receive IP packets addressed to the multicast group address. Moreover, those hosts will not be notified that their Join was ineffective. Although current IP multicast protocols do provide for periodic updates that can detect and repair lost packets, including lost "Joins," these updates are too slow (three or more seconds) for radio communication applications. Thus, for example, a host repeater or console relying on the network protocols to repair a lost Join message would miss all or part of a call, possibly containing critical information. Accordingly, there is a need for a system and method that would enable participating hosts in a multicast IP network having sent IGMP Join messages to know whether they have reliably (i.e., successfully) Joined an IP multicast group. Advantageously, the method will provide for detecting failed Join(s) relatively quickly (i.e., without relying on periodic updates from router(s) of the network) so that, when necessary, the Join(s) may be re-accomplished to reduce or eliminate the likelihood that any affected host(s) will lose critical information that might be conveyed in a talkgroup or point-to-point call. The present invention is directed to satisfying these needs.

BRIEF DESCRIPTION OF THE DRAWINGS

The foregoing and other advantages of the invention will become apparent upon reading the following detailed description and upon reference to the drawings in which:

FIG. 7 is a message sequence chart illustrating an example reliable Join procedure in a point-to-point call, with all Join messages successful; and FIG. 8 is a message sequence chart illustrating an example reliable Join procedure in a point-to-point call, with all Join messages successful, where a base site is added to the call due to roaming of a communication unit during call hang time.

DESCRIPTION OF PREFERRED EMBODIMENTS

The following describes systems and methods for host devices participating in talkgroup and point-to-point calls to reliably join multicast group address(es).

In one embodiment of the present invention, there is provided a method for a receiving host to determine whether it has reliably joined a multicast group address. The method comprises sending, from a sourcing host to one or more network devices, one or more packets addressed to a multicast group address. The packets may comprise test packets ("hello packets") or payload. The receiving host issues a join command to the one or more network devices in an attempt to reliably join the multicast group address. If any packets are received by the receiving host within a designated time period associated with the attempt, the receiving host is reliably joined to the multicast group address; otherwise, if any packets are not received by the receiving host within the designated time period, the receiving host is not reliably joined to the multicast group address.

In another embodiment of the present invention, there is provided a method for a host acting as a receiver in a point-to-point call, to determine whether it has reliably joined a multicast group address designated for receiving packets. The method comprises sending, from a controller to a first and second host desiring to participate in a point-to-point call, a first and second multicast group address. The first host sends one or more packets, i.e., hello packets or payload addressed to the first multicast group address, to one or more network devices. The second host, acting as a receiver, issues a join command to the one or more network devices in an attempt to reliably join the first multicast group address. If any packets are received by the second host within the designated time period, the second host is reliably joined to the first multicast group address; otherwise, if any packets are not received by the second host within the designated time period, the second host is not reliably joined to the first multicast group address.

The second host may similarly send hello packets or payload addressed to the second multicast group address, to one or more network devices. The first host, acting as a receiver, issues a join command to the one or more network devices to reliably join the second multicast group address. If any packets are received by the first host within the designated time period, the first host is reliably joined to the second multicast group address; otherwise, if any packets are not received by the first host within the designated time period, the first host is not reliably joined to the second multicast group address.

Figure 1:
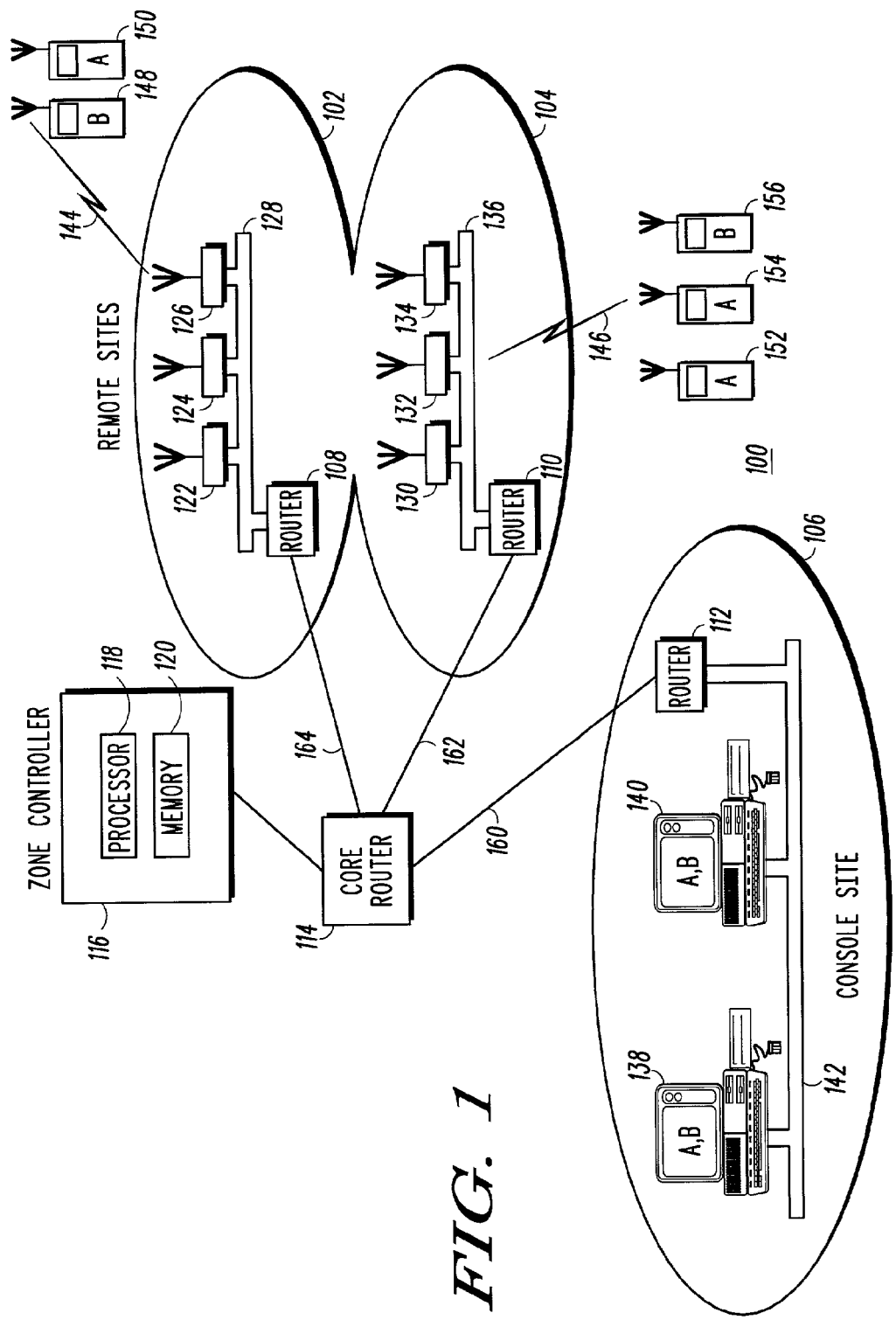
FIG. 1 is a block diagram of an IP multicast communication system according to the invention.

Turning now to the drawings and referring initially to FIG. 1, there is shown an IP multicast communication system (or "network") 100 comprising a plurality of sites 102, 104, 106 that are logically coupled, via respective router elements 108, 110, 112 to a core router element 114. The router elements 108–114 are functional elements that may be embodied in separate physical routers (for example, 3Com "NetBuilder" series routers) or combinations of routers. Nevertheless, for convenience, the router elements will hereinafter be referred to as "routers." The core router 114 is sometimes referred to as the "Rendezvous Point" or "RP Router" because it is a rendezvous point of the multicast distribution tree between host devices at different sites. The core router 114 is coupled to a zone controller 116 having a processor 118 (such as a microprocessor, microcontroller, digital signal processor or combination of such devices) and a memory 120 (such as volatile or non-volatile digital storage devices or combination of such devices). In one embodiment of the present invention, the zone controller 116 manages and assigns IP multicast addresses for payload (voice, data, video, etc.) and control messages between and among the various sites 102, 104, 106.

As depicted in FIG. 1, site 102 includes a plurality of repeaters 122, 124, 126 that are coupled, via Ethernet 128 to an associated router 108. Similarly, site 104 includes a plurality of repeaters 130, 132, 134 that are coupled, via Ethernet 136 to router 110. Generally, the repeaters at the various sites 102, 104 communicate, via wireless communication resources 144, 146 with a plurality of communication units 148–156 (sometimes called "subscriber units") which may comprise mobile or portable wireless radio units. Suitable wireless communication resources 144, 146 are multiple RF (radio frequency) channels such as pairs of frequency carriers, time division multiple access (TDMA) slots, code division multiple access (CDMA) channels, or any other RF transmission media. In the case where the communication resources comprise RF channels, it is common to assign separate channels and/or separate repeaters for different types of communication traffic. Thus, the repeaters at the various sites 102, 104 may comprise control channel repeaters, voice channel repeaters and/or link repeaters. For convenience, the term "repeater site" or simply "base site" will be used hereinafter instead of referring specifically to the repeater(s) at a particular site. In contrast, site 106 includes a plurality of dispatch consoles 138, 140 that are coupled via Ethernet 142 to router 112 and defines a "console" site. Consoles 138, 140 may comprise wireless or wireline consoles. Although not shown in FIG. 1, it will be appreciated that a single site may include both repeaters and console positions.

Practitioners skilled in the art will appreciate that the network 100 may include various other communication devices not shown in FIG. 1. For example, the network 100 may include wireline communication device(s), site controller(s), comparator(s), telephone interconnect device(s), internet protocol telephony device(s), call logger(s), scanner(s) and gateway(s). Generally, such communication devices may be either sources or recipients of payload and/or control messages routed through the network 100. These devices are described briefly below.

A site controller is a device having a processor (such as a microprocessor, microcontroller, digital signal processor or combination of such devices) and a memory (such as volatile or non-volatile digital storage devices or combination of such devices), that may be located at a particular site. A site controller may be used to control the communication of payload and/or control messages between repeater(s) at a particular site. A site controller may also control communications between the repeater(s) and their associated router. In one embodiment, for example, a site controller sends IGMP Leave and Join messages to a router associated with a particular site to enable the repeater(s) at that site to receive payload and/or control messages addressed to particular multicast group address(es).

A comparator (or "voter") is a device, usually connected by wireline to various receivers (e.g., different repeaters) receiving different instance(s) of a particular message or signal (e.g., from a subscriber radio unit). The comparator receives and compares among the different instances of the signal that may be received by the different receivers, and produces an output message that is comprised of either an entire message from one of the receivers or a composite message comprised of segments of the message received from one or more of the receivers. Each message may be comprised of a plurality of message frames.

A scanner is a receiver that is adapted to monitor message transmissions from communication devices such as mobile or portable wireless radio units, consoles, repeaters, and the like. In one mode of operation, for example, a scanner scans the radio spectrum for the purpose of finding and, optionally, locking on to carrier frequencies containing message transmissions. Scanners are sometimes used by parties that are not intended recipients of the message transmissions and thus may or may not be members of a particular talkgroup for which the message transmissions are intended.

A telephone interconnect device is a network-based device that provides voice transcoding services between mobile and land line subscribers when invoking full duplex telephone calls between those two subscribers. A transcoding service is required, for example, when a mobile subscriber using ACELP vocoding requests a call to a subscriber in the public switched telephone network (PSTN) using 64-kilobit per second PCM vocoding.

An internet protocol telephony device comprises a telephone that transports voice and/or control messages over a LAN to a telephony gateway box, which interfaces multiple (LAN based) phones and converts the IP control and audio packets back into the format of the local PSTN. More generally, a gateway device is one that provides voice and control translation services between two dissimilar communication systems. For example, a gateway device would be required if an APCO system were to be connected to a GSM system. Other services such as feature translation, authentication, authorization and encryption could also be provided by a gateway device.

A call logger is a networked based device that records packetized voice talkgroup and private calls in a public safety system. A call logger could also record data calls. A call logger device typically stores the voice payload in its native format (i.e. vocoded audio). When it is desirable to playback the voice conversation at a later time, the call logger retrieves and decodes all packets which bound the call in question.

As shown in FIG. 1, the plurality of communication units 148-156 are arranged into talk groups having corresponding talk group identifications as known in the art. Any number of talk groups having corresponding talk group identifications can be established within the system 100. In FIG. 1, two separate talk groups are shown, identified by labels "A" and "B." Talk group "A" at least includes the communication units 150, 152, 154 and talk group "B" at least includes the communication units 148, 156. Console positions 138, 140 can affiliate with either, or both talkgroups "A" and "B" and, accordingly, may be considered members of both talk groups "A" and "B." The communication system 100 may also support point-to-point calls, for example, between communication units 148 and 152.

According to one embodiment of the present invention, the zone controller 116 dynamically assigns and manages IP multicast addresses for payload (voice, data, video, etc.) and/or control messages between and among communication devices participating in talkgroup or point-to-point calls at the various sites 102, 104, 106. That is, multicast group addresses for particular talkgroups are not fixed (and therefore, are not stored in memory of devices distributed throughout the network) but rather are identified and assigned by the zone controller 116 on a call-by-call basis. As such, multicast group address(es) are only temporarily assigned to any one call and can be reassigned to different calls as needed or desired. Dynamic, rather than static assignment of addresses is advantageous in terms of efficient use of resources in the network. However, as will be appreciated, multicast group address(es) may also be statically assigned for particular talkgroups or communication devices.

Multipoint routes pertaining to the IP multicast addresses used in the present invention are maintained by the routers 108-114 forming the network 100. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast-Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, the Protocol Independent Multicast-Dense Mode (PIM-DM) protocol or other protocols that may be devised in the future may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication.

Figure 2:
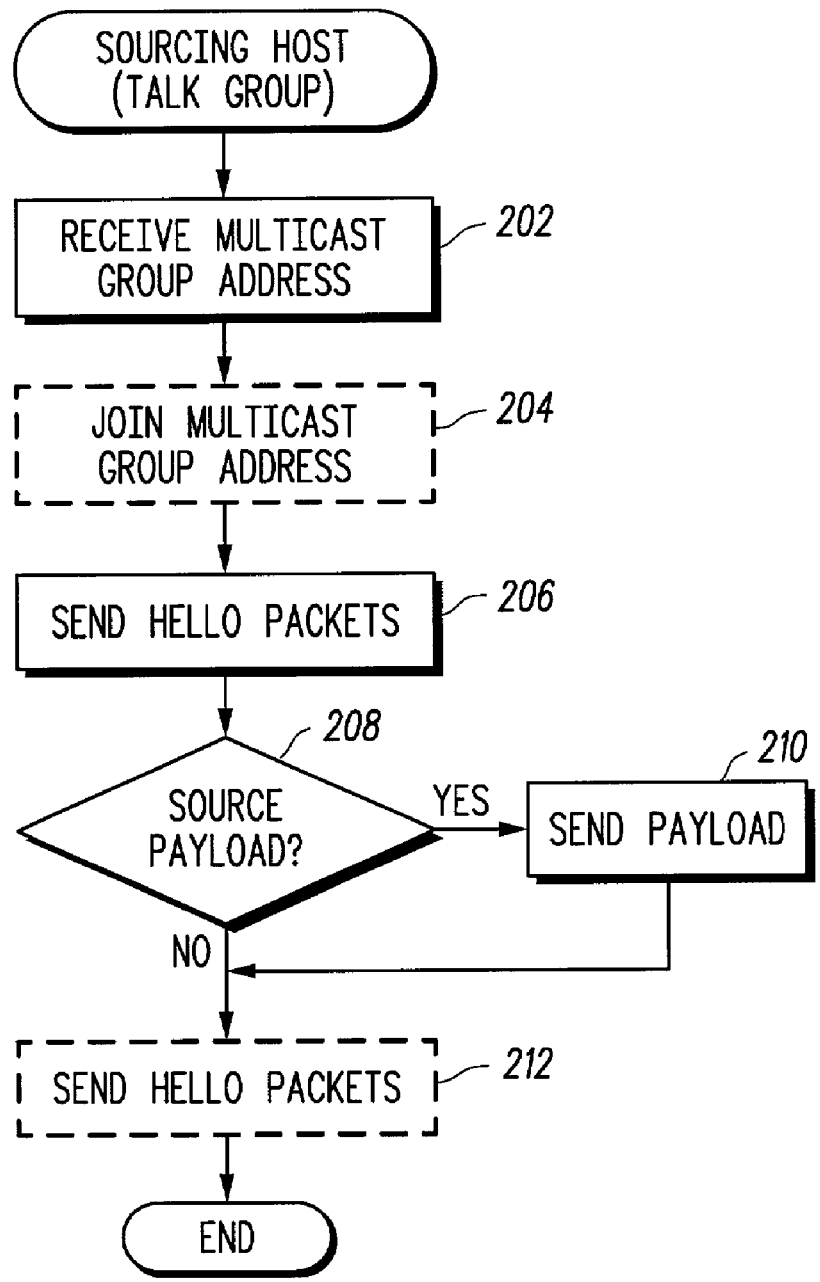
FIG. 2 is a flowchart showing steps of a reliable Join procedure performed by a sourcing host of a talkgroup call according to the invention.
Figure 3:
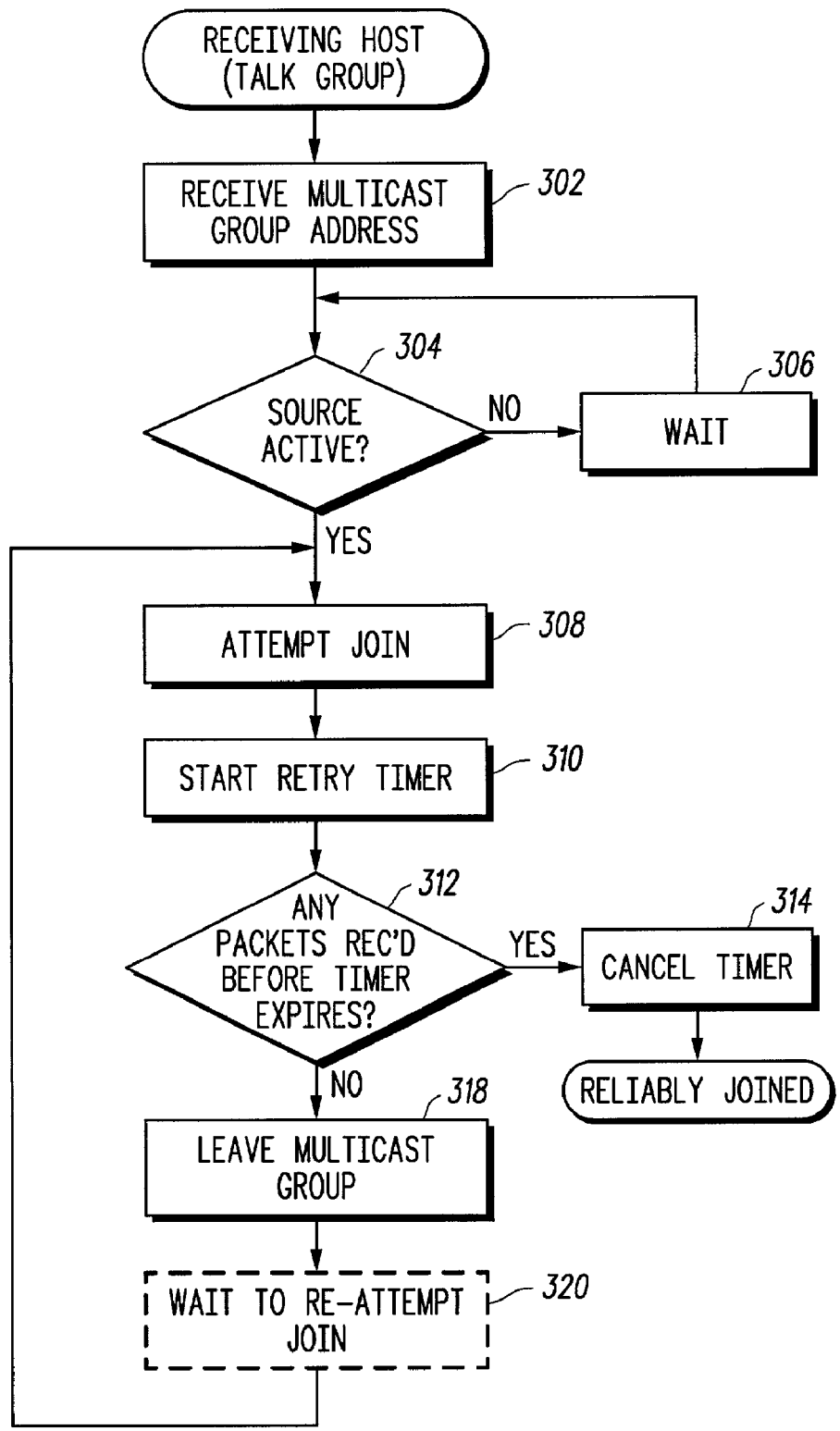
FIG. 3 is a flowchart showing steps of a reliable Join procedure performed by a receiving host of a talkgroup call according to the invention.

FIG. 2 shows steps performed by a sourcing host, and FIG. 3 shows steps performed by a receiving host, to accomplish a reliable Join procedure for a talkgroup call according to one embodiment of the present invention. The sourcing and receiving host(s) comprise those endpoints of the communication system 100 that are sources and recipients, respectively, of packet data addressed to a particular multicast group address. As will be appreciated, any IP host device including, but not limited to, repeater/base station(s), console(s), router(s), site controller(s), comparator/voter(s), scanner(s), site controller(s), telephone interconnect device(s) or internet protocol telephony device(s) may be a source or recipient of packet data. Historically, the communication units 148–156 are not IP host devices and, as such, would not comprise sourcing or receiving hosts as defined herein, even though they may be the ultimate source of a communication to a first host, or conversely, the ultimate destination of a communication from a second host. Nevertheless, it is anticipated that some communication systems will extend IP host functionality to the communication units 148–156, in which case the communication units 148–156 may comprise sourcing or receiving hosts as defined herein. The steps of FIGS. 2 and 3 are implemented, where applicable, using stored software routines within the sourcing or receiving hosts. Message sequence charts useful for illustrating the steps of FIGS. 2 and 3 are shown at FIGS. 4 and 5.

The flowchart of FIG. 2 begins at step 202, with the sourcing host receiving a multicast group address that is to be used for distributing packet data to participating communication devices of the talkgroup call. In one embodiment, the multicast group address comprises a payload multicast group address that is used for distributing payload, such as audio (including but not limited to voice), video, data, multimedia, etc. to participating devices in the talkgroup call. Alternatively or additionally, the multicast group address may comprise a control multicast group address for distributing control messages between participating devices. The participating devices include the talkgroup members and/or any IP host device having Joined the multicast group address.

Figure 4:
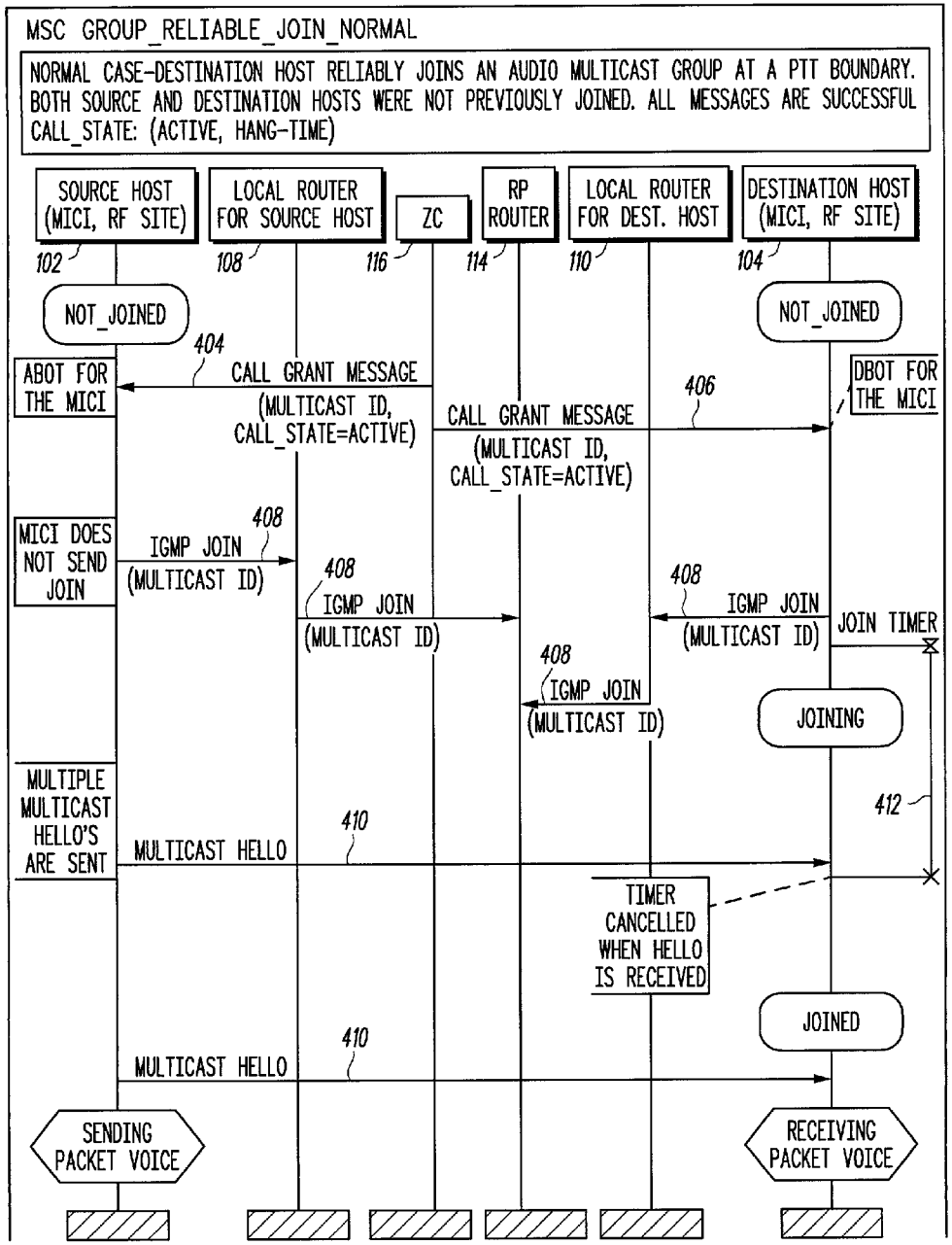
FIG. 4 is a message sequence chart illustrating an example reliable Join procedure in a talkgroup call, with all Join messages successful.
Figure 5:
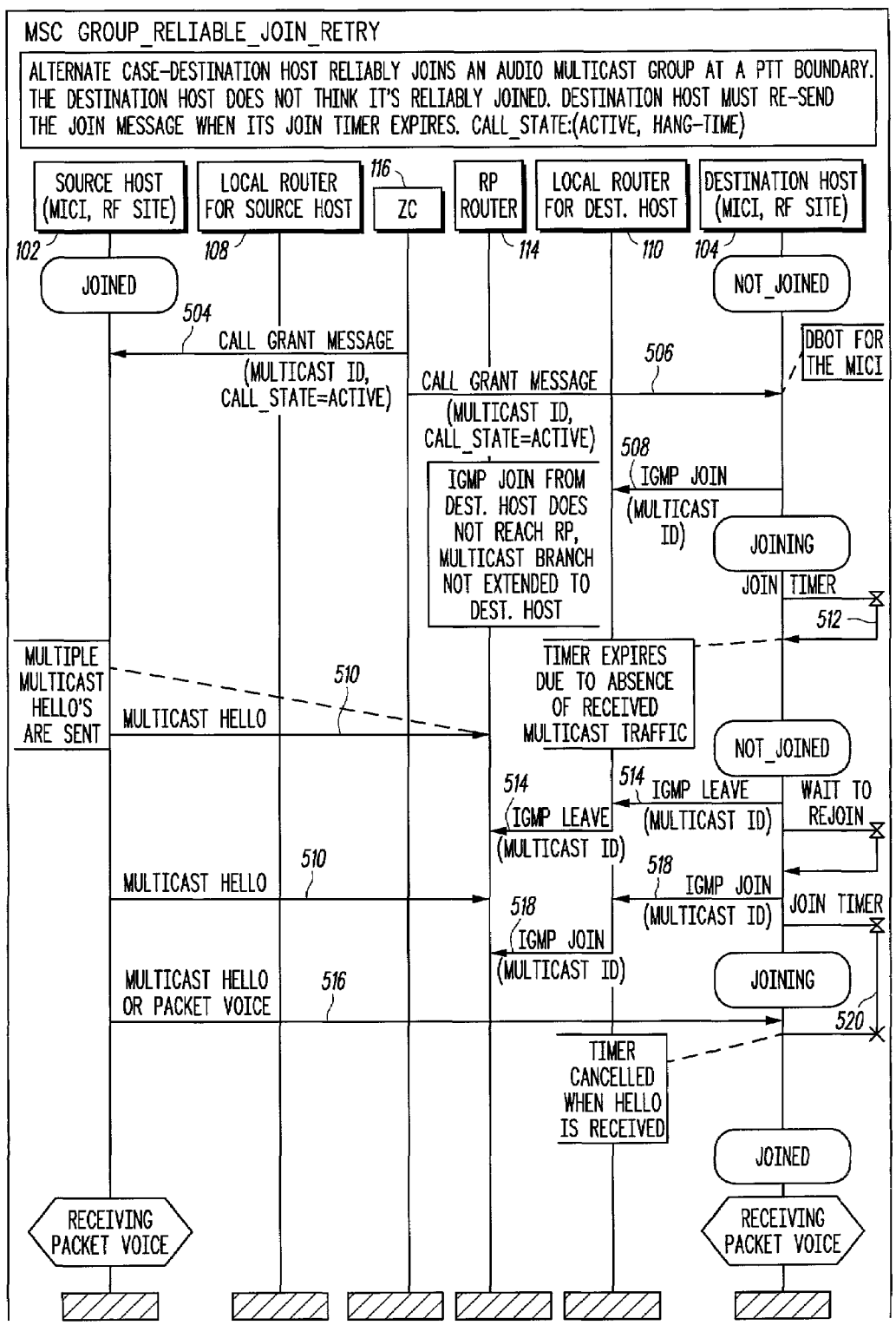
FIG. 5 is a message sequence chart illustrating an example reliable Join procedure in a talkgroup call, with Join messages from a receiving host initially unsuccessful.

In the example of FIG. 4, the multicast group address is a payload multicast group address that is included in a call grant message 404 sent from the zone controller 116 to the sourcing host (e.g., base site 102). Call grant messages 406 including the payload multicast group address are also sent by the zone controller to receiving hosts of the talkgroup call. Typically, the call grant messages 404, 406 are generated by the zone controller in response to the sourcing host having sent a call request (not shown) for a talkgroup call. Alternatively, payload and/or control multicast group addresses may be included in affiliation acknowledgement message(s) (not shown) upon the participating devices affiliating with the talkgroup.

At step 204, the sourcing host may join the multicast group address received at step 202 by sending an IGMP "Join" message to its associated router. This step is optional because, according to IGMP protocols, sourcing host devices may send IP datagrams addressed to a particular multicast group address without joining that address. It is only necessary for host devices to join a particular multicast group address if they desire to receive IP datagrams addressed to that address. Hence, the receiving hosts must Join, but the sourcing host optionally Joins the multicast group address. Nevertheless, in the example of FIG. 4, both the sourcing host (base site 102) and the receiving host (base site 104) send IGMP Join messages 408 to their respective local routers 108, 110. The local routers 108, 110 send PIM Join messages 408 to the core router 114 to form the spanning tree of router interfaces logically connecting the participating hosts. For convenience, both IGMP and PIM Join messages will hereinafter be referred to as "Join" messages.

Once the router interfaces are established, i.e, upon at least the receiving host(s) having successfully joined the IP multicast group address, packets may be distributed by the router(s) of the network to the receiving hosts. However, as has been noted, if the Join messages from any of the receiving hosts are corrupted somewhere in the network, then those host(s) will not have successfully joined the multicast group address, the spanning tree of router interfaces will not extend to those host(s) and, consequently they will not be able to participate in the talkgroup call (at least until such time as they successfully Join the multicast group address).

The present invention provides a method for participating hosts to know whether they have reliably (i.e., successfully) Joined an IP multicast group. This is accomplished by the sourcing host sending one or more test packets, or "hello" packet(s) addressed to the multicast group address at step 206 such that may be received by any participating hosts that have reliably joined the multicast group address. In one embodiment, as shown in FIG. 4, multiple hello packets 410 are sent by the sourcing host (e.g., base site 102) after it receives the call grant message and before sourcing payload. At step 208, if the sourcing device is to source payload, it sends payload packets addressed to the multicast group address at step 210. As will be described in greater detail in relation to FIG. 3, the receiving of (or failure to receive) the hello or payload packets within a particular period of time enables participating devices to know whether or not they have successfully joined the IP multicast group and to re-attempt sending the Join message if necessary.

It is noted again that the sourcing host defines a sourcing endpoint of the IP packet network but may or may not be the ultimate source of payload that is to be communicated to the talkgroup. Commonly, for example, the ultimate source of payload for a talkgroup call is a wireless communication unit that is affiliated with a particular base site, in which case the base site is the sourcing host, as defined herein. That is the case in FIG. 4, wherein the sourcing host is base site 102, it is presumed but not shown that the source of payload is a wireless communication unit affiliated with base site 102. In such case, when the base site receives a call grant, it is forwarded to the communication unit and the communication unit switches from a control channel to a voice channel before it sources the call. Advantageously, the base site sends multiple hello packets to the multicast group address at step 206 during the period of delay when the communication unit is moving from a control channel to a voice channel, before it sources the call. In the case where the sourcing host (e.g., base site, console, etc.) is itself the ultimate source of payload for a talkgroup call, the determination of whether to send payload at step 208 may be appropriately delayed by the sourcing host to allow adequate time for sending hello packets.

Optionally, when the sourcing host has finished sourcing payload at step 210, the sourcing host may send further hello packets at step 212. In one embodiment, step 210 is not performed in a talkgroup call because it is likely to result in hello packets being sourced from multiple endpoints, thereby cluttering the network.

Now turning to FIG. 3, there will be described steps of the reliable Join procedure executable by a receiving host in a talkgroup call according to the present invention. At step 302, the receiving host receives a multicast group address, which in one embodiment comprises a payload multicast group address for receiving hello packets or payload from the sourcing device. For example, with reference to FIG. 4, the receiving host (base site 104) receives from the zone controller 116 a call grant message 406 including the payload multicast group address. According to IGMP protocol, the multicast group address received by the receiving host (to receive hello packets or payload) must be the same multicast group address that is used by the sourcing host to send hello packets or payload.

In one embodiment, if the call state is active (step 304), that state is also indicated in the call grant message 406. An active call state indicates that there is a sourcing host identified for the call from which the receiving host may expect to receive either hello packets or payload. Optionally, the call state may indicate "no source" if the call has been granted but there is no sourcing host identified for the call. For example, a "no source" call state may occur during hang time after a source has dekeyed and there is presently no host sending hello packets or payload. In such case, at step 306, the receiving host may wait to perform the reliable Join procedure until such time as the call becomes active. That is because, for reasons that will become apparent in the remaining description of FIGS. 3 and 4, a talkgroup call can not be validated as reliably joined unless and until there is a sourcing host sending either hello packets or payload; if the receiving host were to attempt the reliable Join procedure without a sourcing host, there would result in multiple Join and Leave messages cluttering the network.

At step 308, the receiving host attempts to join the multicast group address received at step 302 by sending an IGMP "Join" message to its associated router. The local router, in turn, sends a PIM Join message to upstream routers. For example, in FIG. 4, base site 104 sends a Join message 408 to its associated router 110, which sends a Join message 408 to the core router 114. If all of the Join messages are delivered successfully, the router interfaces will be established and the receiving host(s) will be able to receive messages addressed to the multicast group address. However, as has been noted, the Join messages may be corrupted somewhere in the network in which case the router interfaces will not be established. Consequently, any receiving hosts having attempted (unsuccessfully) to Join the multicast group address will not receive the payload messages. The reliable Join procedure of FIGS. 2 and 3 enables participating host device(s) to know with relative certainty whether or not they have successfully joined the multicast group address.

After having attempted to join the multicast group address at step 308, the receiving host starts a retry timer at step 310 and waits to receive packets (e.g., hello packets or payload) that are addressed to the multicast group address. If any packets are received before the timer expires (step 312), the timer is cancelled at step 314 and the receiving host is reliably joined to the multicast group address. For example, FIG. 4 illustrates a case where all Join messages are delivered successfully. The base site 104 knows that it is reliably joined to the multicast group address when it receives a hello packet 410 from the base site 102 before the retry timer 412 expires. Otherwise, if the timer expires without receiving any packets, the receiving host can assume that its Join message was ineffective.

For example, FIG. 5 illustrates a case where Join messages from a destination host are initially unsuccessful. The message sequence begins in generally the same manner as in FIG. 4, with the destination host (e.g., RF site 104) receiving a call grant message 506 with a multicast group address. The RF site 104 sends a Join message 508 to its local router 110, but the Join message does not reach the core router 114, thus the multicast tree set up by the core router 114 does not extend to the RF site 104. The base site 104 starts a retry timer 512 which expires without the base site having received any hello packets or payload addressed to the multicast group address. Consequently, the base site 104 assumes that its Join message was unsuccessful because it does not receive any hello packets or payload before the timer 512 expires.

It should also be noted that if the reliable Join procedure were attempted without a sourcing device sending either hello or payload messages, the timer 512 would always expire without the receiving device receiving any hello packets or payload, regardless of whether the Join messages were successful or not. Thus, it is preferred that the reliable join procedure for a talkgroup call be performed with the source active at step 304.

The base site 104 must then re-attempt to join the multicast group address. However, according to network protocols, local routers will not forward Join messages if it believes that router interfaces are already established with downstream routers. Thus, for example, in the case of FIG. 5, the local router 110, having already forwarded a Join message to the core router 114, believes (wrongly) that the Join message was successful and will not forward further Join messages. To overcome this problem, the base site 104 sends IGMP Leave messages 514 to leave the multicast group address at step 318 (even though the multicast group address was not successfully joined) so that, in a further attempt to join the multicast group address, Join messages 508 will be forwarded to all downstream routers.

In one embodiment, the receiving host waits at step 320 before a next attempt to rejoin to allow failed Join messages to clear the network. The receiving host may then return to step 308 to re-attempt joining the multicast group address, start a second retry timer at step 310, and so forth. In the example of FIG. 5, IGMP Join messages 508 are delivered successfully in a second attempt to join the multicast group address. The receiving host 104 knows that the second attempt is successful because it receives hello packets or payload 516 before expiration of the retry timer 520 associated with the second attempt.

Figure 6:
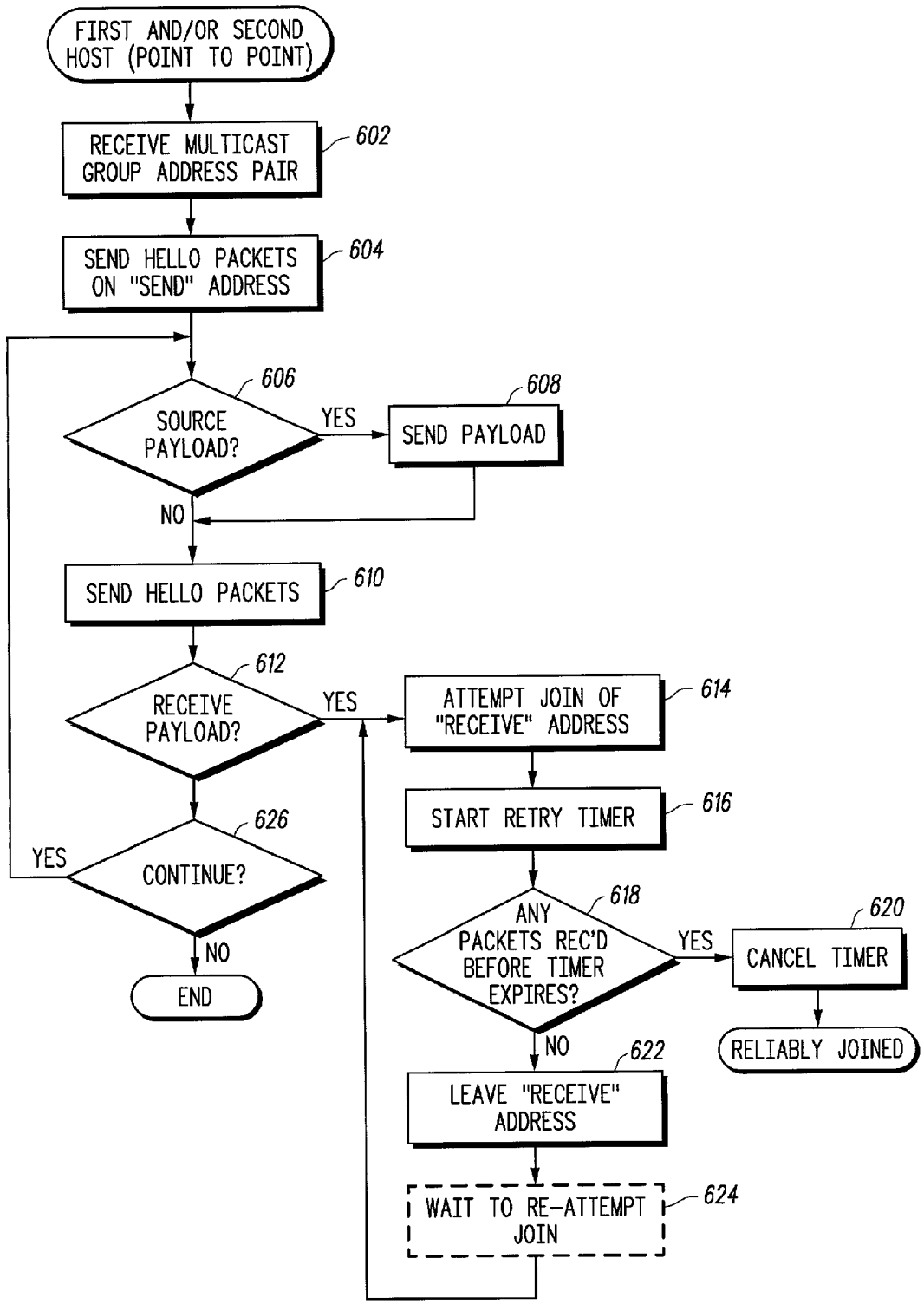
FIG. 6 is a flowchart showing steps of a reliable Join procedure performed by a sourcing and/or receiving host of a point-to-point call according to the invention.

Now turning to FIG. 6, there will be described various steps of a reliable join procedure that may be performed by first and/or second hosts for a point-to-point call according to one embodiment of the present invention. In one embodiment, the first and second hosts comprise any two endpoints of the communication system 100 that may intermittently source and receive IP datagrams addressed to particular multicast group address(es). As will be appreciated, any IP host device including, but not limited to, repeater/base station(s), console(s), router(s), site controller(s), comparator/voter(s), scanner(s), site controller(s), telephone interconnect device(s) or internet protocol telephony device(s) may be a first or second host of a point-to-point call. Historically, the communication units 148–156 are not IP host devices and, as such, would not comprise first or second hosts as defined herein, even though they may be the ultimate source of a communication to a first host, or conversely, the ultimate destination of a communication from a second host. Nevertheless, it is anticipated that some communication systems will extend IP host functionality to the communication units 148–156, in which case the communication units 148–156 may comprise first or second hosts as defined herein. The steps of FIG. 6 are implemented, where applicable, using stored software routines within the first or second hosts. Message sequence charts useful for illustrating the steps of FIG. 6 are shown at FIGS. 8 and 9.

The flowchart of FIG. 6 begins at step 602, with the first and second hosts each receiving a pair of multicast group addresses for a point-to-point call. In one embodiment, the multicast group addresses comprise payload multicast group addresses that are used for distributing payload, such as audio (including but not limited to voice), video, data, multimedia, etc. between the first and second host devices and any other participating devices in the point-to-point call. Alternatively or additionally, the multicast group addresses may comprise control multicast group addresses for distributing control messages between participating devices. The participating devices include the first and second host devices and/or any IP host device having Joined the sending or receiving multicast group address. The pair of multicast group addresses may be provided to the participating hosts in a single message or in multiple messages.

In the example of FIG. 7, the pair of multicast group addresses (MCID X, Y) for a point-to-point call is included in a call grant message 706 returned from the zone controller 116 to the first host (e.g., base site 102). Call grant messages 706 including the pair of payload multicast group address are also sent by the zone controller to the second host (e.g., base site 104) of the point-to-point call. Typically, the call grant messages 706 are generated by the zone controller in response to the first or second host having sent a call request (not shown) for a point-to-point call. In one embodiment, the call grant messages indicate for each of the first and second hosts, which one of the pair of multicast group addresses comprises a "receive" address to be used for receiving, and which one of the addresses comprises a "send" address to be used for sending packets to other devices participating in the call. For example, in FIG. 7, it is presumed (although not shown) that the call grant message indicates that the first multicast address (MCID X) shall be used by the first host (e.g., base site 102) for receiving packets, and the second multicast address (MCID Y) shall be used by the first host for sending packets. The call grant message may indicate, in complementary fashion, that the first multicast address (MCID X) shall be used by the second host (e.g., base site 104) for sending packets, and the second multicast address (MCID Y) shall be used by the second host for receiving packets.

Next, at step 604, the first and/or second hosts send one or more hello packet(s) addressed to their designated "send" multicast group address such that may be received by any participating hosts that have reliably joined that address. For example, FIG. 7 shows the first host (e.g., base site 102) sending multiple hello packets 716 on its "send" address, MCID Y and the second host (e.g., base site 104) sending multiple hello packets 718 on its "send" address, MCID X. Advantageously, the hello packets are sent by the first and/or second hosts after they receive the call grant message and before sourcing payload.

At step 606, if the first and/or second hosts are to source payload, they send payload packets addressed to their "send" multicast group address at step 608. In one embodiment, when either of the first or second hosts has finished sourcing payload at step 608, they send further hello packets at step 610. Thus, during an active call, the first and/or second hosts are always sourcing either hello packets or payload. As will be described in greater detail in relation to FIG. 8, always sending hello packets or payload ensures that host devices will be able to perform a reliable join procedure at any time during a point-to-point call, including for example when a base site is newly added to the call during hang time because of roaming of a communication unit into the coverage area of that base site during call hang time.

At step 612, if the first and/or second hosts are to act as a receiver, they attempt to join their designated "receive" multicast group address at step 614 by sending an appropriate IGMP "Join" message to their associated local router. The local routers, in turn, send PIM Join message(s) to the core router. For example, in FIG. 7, both base sites 102, 104 act as receivers. Base site 102 sends a Join packet 708 to local router 110 in an attempt to join its designated receive address, MCID X. Similarly, base site 104 sends a Join packet 710 to its local router 110 in attempt to join its designated receive address, MCID Y. The local routers, in turn, forwards the packets 708, 710 to the core router 114. If all of the Join messages are delivered successfully, the router interfaces will be established and the first and second host(s) will be able to receive messages addressed to their "receive" multicast group address. However, as has been noted, the Join messages may be corrupted somewhere in the network in which case the router interfaces will not be established. Consequently, any hosts having attempted (unsuccessfully) to Join their designated receive multicast group address will not receive the payload messages. The reliable Join procedure of FIG. 6 enables any host device(s) acting as receivers to know with relative certainty whether or not they have successfully joined their designated receive multicast group address.

After having attempted to join the receive multicast group address at step 614, the first and/or second host starts a retry timer at step 616 and waits to receive packets (e.g., hello packets or payload) that are addressed to the receive multicast group address. If any packets are received before the timer expires (step 618), the timer is cancelled at step 620 and the host knows that it is reliably joined to the receive multicast group address. For example, FIG. 7 illustrates a case where all Join messages are delivered successfully. The base site 102 knows that it is reliably joined to the multicast group address, MCID X, when it receives a hello packet 718 from the base site 104, addressed to the multicast group MCID X before the retry timer 712 expires. Similarly, the base site 104 knows that it is reliably joined to the multicast group address, MCID Y, when it receives a hello packet 716 from the base site 102, addressed to the multicast group MCID Y before the retry timer 714 expires.

Otherwise, if the retry timer of either (or both) of the hosts expires without receiving any packets, those host(s) can assume that their Join message was ineffective. At step 622, any hosts that were unsuccessful in joining their designated "receive" address leaves the multicast group, for the same reasons described in relation to FIG. 3. Optionally, the affected host waits at step 624 before a next attempt to rejoin to allow failed Join messages to clear the network. The receiving host may then return to step 614 to re-attempt joining the multicast group address, start a second retry timer at step 616, and so forth.

At step 612, if either of the first or second hosts do not desire to receive payload, they may elect to continue (step 626) to intermittently send payload and hello packets, in which case the process returns to step 606. If at step 626 the first or second hosts do not desire to continue the call, the process ends.

Now turning to FIG. 8, there is shown an example message sequence that may occur when a base site is added to the call due to roaming of a communication unit during call hang time. It is assumed that there is point-to-point call in progress between mobile radios initially registered at a first base site (RF Site 1) and a third base site (RF Site 3), respectively. Thus, the initial endpoints (hosts) of the point-to-point call are RF Site 1 and RF Site 3. RF Site 3 is joined to its designated "receive" address, MCID X. Because the call is in hang time, there is no payload presently being sourced for the call. However, RF Site 3 is sending multiple hello packets on its designated "send" address, MCID Y, so that new host devices added during call hang time may perform a reliable join procedure.

For example, FIG. 8 assumes that the mobile radio roams from RF Site 1 to a new site, RF Site 2. RF Site 2 receives an affiliation request, or registration request 802 from the mobile radio and forwards it to the zone controller. The zone controller returns a registration response message 804 to RF Site 2, which forwards it to the mobile radio. At this point, the mobile radio is registered with RF Site 2, but the new host device, RF Site 2 is neither joined to nor is aware of the designated "receive" address for the point-to-point call.

The zone controller sends a call grant message 806 to the RF Site 2 including a pair of multicast group addresses (MCID X, MCID Y), indicating which of the respective addresses is to be used for sending and receiving messages and further indicating that the call is in hang time. RF Site 2 sends an IGMP Join message 810 to its local router in an attempt to join its designated "receive" address, MCID Y and starts a Join timer 812. The Join message 810 is forwarded to the RP router to form a spanning tree of router interfaces, as has been described. The RF Site 2 sends hello packets 814 or payload addressed to its designated "send" multicast group address. The RF Site 2 knows that it is reliably joined to its "receive" multicast group address, MCID Y, when it receives a hello packet 816 from the RF Site 3, addressed to the multicast group MCID Y before the retry timer 812 expires. It is noted that RF Site 2 would not have been able to perform a reliable Join procedure if RF Site 3 did not send hello packets, because during hang time there is no payload being sourced for the call that would validate whether the Join was successful.

The present disclosure therefore has identified various methods for IP host devices to reliably join multicast group address(es) in talkgroup or point-to-point calls. The methods provide for detecting failed Join(s) relatively quickly so as Joins may be re-accomplished, if necessary. Advantageously, the methods provide for achieving reliable Joins before payload is sourced so that receiving devices do not lose critical information that might be conveyed in a talkgroup or point-to-point call.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a multicast network, a method comprising:
    at a first host, wherein the first host is an endpoint of the multicast network that receives one or more packets addressed to a multicast group address:
    receiving indicia that a second host is actively sourcing one or more packets addressed to a multicast group address, wherein the second host is an endpoint of the multicast network;
    issuing a join command to the one or more network devices in an attempt to join the multicast group address;
    determining whether any packets are received within a designated time period after the step of issuing a join command; and
    if any packets are received by the first host within the designated time period, determining that the first host is joined to the multicast group address; otherwise, if any packets are not received by the first host within the designated time period, determining that the first host is not joined to the multicast group address.

2. The method of claim 1, wherein the packet is one of a test packet and a payload packet.

3. The method of claim 2, wherein the payload packet comprises any one of an audio payload, a data payload, a video payload, and a multimedia payload.

4. The method of claim 1 further comprising the step of receiving at least one test packet before receiving a payload packet.

5. The method of claim 1 comprising the step of receiving a call grant message comprising the multicast group address.

6. The method of claim 1, wherein the step of issuing a join command comprises, sending an IGMP Join message to one or more network devices.

7. The method of claim 1 further comprising the step of, if the first host is determined to not be joined to the multicast group address,
    issuing a leave command to the one or more network devices; and
    re-attempting to join the multicast group address, comprising the steps of:
        issuing a second join command to the one or more network devices in a second attempt to join the multicast group address;
        determining whether any packets are received within a designated time period after the step of issuing a second join command; and
        if any packets are received within the designated time period, determining that the first host is joined to the multicast group address; otherwise, if any packets are not received within the designated time period, determining that the first host is not joined to the multicast group address.

8. The method of claim 7, wherein the step of issuing a leave command comprises, sending an IGMP Leave message to one or more network devices.

9. The method of claim 1, wherein the step of determining whether any packets are received within a designated time period comprises the steps of:
    starting a timer having a predetermined expiration time; and
    determining whether any packets addressed to the multicast group address are received by the first host before the predetermined expiration time.

10. The method of claim 1 wherein the first and second hosts are selected from the group consisting of: a portable wireless communication device, a mobile wireless communication device, a wire-line communication device, a wireless console, a wire-line console, a repeater, a site controller, a comparator, a telephone interconnect device, an internet protocol telephony device, a call logger, a scanner and a gateway.

11. In a multicast network, a method comprising:
    sending, from a controller to a first and second host desiring to participate in a point-to-point call, a first and second multicast group address, wherein the first and second host are endpoints of the multicast network that source and receive one or more packets addressed to multicast group addresses;
    sending, from the first host to one or more network devices, one or more packets addressed to the first multicast group address;
    issuing, by the second host, a join command to the one or more network devices in an attempt to join the first multicast group address;
    determining whether any packets are received by the second host within a designated time period associated with the attempt; and
    if any packets are received by the second host within the designated time period, determining that the second host is joined to the first multicast group address; otherwise, if any packets are not received by the second host within the designated time period, determining that the second host is not joined to the first multicast group address;
    sending, from the second host to one or more network devices, packets addressed to the second multicast group address;
    issuing, by the first host, a join command to the one or more network devices in an attempt to join the second multicast group address;
    determining whether any packets are received by the first host within a designated time period associated with the attempt; and
    if any packets are received by the first host within the designated time period, determining that the first host is joined to the second multicast group address; otherwise, if any packets are not received by the first host within the designated time period, determining that the first host is not joined to the second multicast group address.

12. The method of claim 11 further comprising, if the second host is determined to not be joined to the first multicast group address, issuing, by the second host, a leave command to the one or more network devices; and re-attempting to join the first multicast group address, comprising:

issuing, by the second host, a second join command to the one or more network devices in a second attempt to join the first multicast group address;

determining whether any packets are received by the second host within a designated time period associated with the second attempt; and if any packets are received by the second host within the designated time period, determining that the second host is joined to the first multicast group address; otherwise, if any packets are not received by the second host within the designated time period, determining that the second host is not joined to the first multicast group address.

13. The method of claim 11 further comprising, if the first host is determined to not be joined to the second multicast group address, issuing, by the first host, a leave command to the one or more network devices; and re-attempting to join the second multicast group address, comprising:

issuing, by the first host, a second join command to the one or more network devices in a second attempt to join the second multicast group address;

determining whether any packets are received by the first host within a designated time period associated with the second attempt; and if any packets are received by the first host within the designated time period, determining that the first host is joined to the second multicast group address; otherwise, if any packets are not received by the first host within the designated time period, determining that the first host is not joined to the second multicast group address.

14. The method of claim 11, wherein the packet comprises one of test packet and payload.

15. The method of claim 11, wherein the payload comprises any one of an audio payload, a data payload, a video payload, and a multimedia payload.

16. The method of claim 11, wherein the step of sending packets comprises sending multiple test packets before sending payload.

17. The method of claim 16, wherein the step of sending packets further comprises sending multiple test packets after sending payload.

18. The method of claim 11 wherein the step of sending first and second multicast group addresses comprises sending, from a controller to the first and second hosts, call grant messages including the first and second multicast group addresses.

19. A communication system comprising:

a controller being operable to identify a multicast group address to be used for distributing packet information to participating receiving devices, wherein the participating receiving devices are endpoints of the communication system that source and receive packets on the multicast group address;

the participating receiving devices that a) receive indicia that a sourcing device is actively sourcing one or more packets addressed to the multicast group address and b) issue a join command to one or more network devices;

a multicast packet network for distributing the multicast group address to the participating receiving devices, the packet network being adapted to set up a multicast distribution tree between participating receiving devices having successfully joined the multicast group address; and means for determining whether the participating receiving devices have joined the multicast group address based on whether the participating receiving devices receive any packets on the multicast group address before expiration of a designated time period.

20. The method of claim 19 wherein the participating receiving devices are selected from a group consisting of: a portable wireless communication device, a mobile wireless communication device, a wire-line communication device, a wireless console, a wire-line console, a repeater, a site controller, a comparator, a telephone interconnect device, an internet protocol telephony device, a call logger, a scanner and a gateway.

* * * * *

UNITED STATES PATENT AND TRADEMARK OFFICE
CERTIFICATE OF CORRECTION

PATENT NO. : 7,133,371 B2  Page 1 of 1
APPLICATION NO. : 09/728359
DATED : November 7, 2006
INVENTOR(S) : Helm et al.

It is certified that error appears in the above-identified patent and that said Letters Patent is hereby corrected as shown below:

Claim 11, Col. 14, line 41, please change "aftempt" to --attempt--

Signed and Sealed this

Fourteenth Day of August, 2007

JON W. DUDAS
*Director of the United States Patent and Trademark Office*